United States Patent [19]

Wisdom et al.

[11] 4,122,198

[45] Oct. 24, 1978

[54] PROCESS FOR PREPARING A COOKED DOUGH PRODUCT

[75] Inventors: Lawrence W. Wisdom, Dallas; Ray M. Trinidad, Arlington, both of Tex.

[73] Assignee: Frito-Lay, Inc., Dallas, Tex.

[21] Appl. No.: 667,458

[22] Filed: Mar. 16, 1976

[51] Int. Cl.² ............................................. A21D 6/00
[52] U.S. Cl. ................................. 426/439; 426/466; 426/496; 426/808
[58] Field of Search ............... 426/439, 466, 496, 523, 426/457, 808, 383, 438, 104, 560

[56] References Cited

U.S. PATENT DOCUMENTS

| | | | |
|---|---|---|---|
| 1,965,082 | 7/1934 | McKee | 426/466 X |
| 3,282,704 | 11/1966 | Fritzberg | 426/466 X |
| 3,677,769 | 7/1972 | King | 426/383 X |
| 3,830,946 | 8/1974 | Ruhdorfer | 426/439 X |
| 3,864,505 | 2/1975 | Hunter et al. | 426/439 X |

OTHER PUBLICATIONS

Webster's New World Dictionary; Complete Reference Edition; Second College Addition (1968); p. 1494.

Primary Examiner—Kenneth M. Schor
Attorney, Agent, or Firm—Bernard & Brown

[57] ABSTRACT

There are disclosed farinaceous dough products having good organoleptic characteristics, especially desirable flavor and taste, which are dough products having a minor portion of the surface of the product selectively toasted by localized heat before the total product is fried or baked. The heat applied to the dough surface is controlled so as to toast the minor portion of the surface without removing too much moisture from the remainder of the dough. The finished product has a toasted flavor when consumed.

9 Claims, No Drawings

PROCESS FOR PREPARING A COOKED DOUGH PRODUCT

This invention relates to farinaceous dough products having good organoleptic characteristics. More particularly, the invention concerns fried or baked, farinaceous dough products having especially desirable flavor and taste characteristics due to having a minor amount of the surface area of the product selectively toasted by localized heat before the total product is fried or baked.

Conventionally, dough products, e.g., corn chips, are made from dough pieces by a variety of procedures including one or more of baking, toasting and frying. Particularly desirable chip products are made by frying and it is recognized that a product of even more desirable flavor taste can be made if the surfaces of the chips are partially browned or toasted before frying. For example, in one procedure for making tortilla chips, the dough chips are first partially toasted so that certain portions, e.g., the raised areas of dough which project from the main body of the chips, become browned or toasted without cooking the entire chip to the desired extent most suitable for eating. The partially toasted chips are then fried to the desired low moisture content. This combination of steps provides both the desirable flavor afforded by toasting and frying, and enhancement of mouth feel, texture and eating quality derived from the oil which is absorbed during the frying. The procedure is, however, disadvantageus since it requires that the entire chip be subjected to elevated temperatures during both the toasting and frying operations which causes considerable consumption and loss of heat, and due to the longer period of time the chips are heated, they may experience undesirable product degradation and loss of nutrients unless considerable care is taken. Moreover, when the entire chip is subjected to toasting by, for instance, passing the pieces over a hot flame on a metal conveyor, the subsequent frying of the toasted chips results in the puffing of the chips to form a pillow-like piece which would be undesirable and uncharacteristic of a tortilla chip. To avoid this puffing, it is necessary before frying to condition the toasted chips under controlled conditions of temperature and humidity for a period of time to effect rehydration of the chip surface. If the toasting operation is omitted and the chips merely fried or baked, the desired minor amount of toasted portion of the chips cannot be developed witout undue cooking of the total chip.

The present invention provides new farinaceous dough products, e.g., grain or potato-derived chips, of the fried or baked variety having good organoleptic characteristics, especially good flavor and taste. The products of this invention are edible, fried or baked, farinaceous dough pieces having a minor portion of their surface area selectively toasted to impart the desired organoleptic properties. The selective toasting of the dough is conducted by applying heat to only a minor portion of the surface of the dough before the total dough is fried or baked. This localized heating causes the toasting of a minor portion of the surface of the dough without subjecting the remaining surface and most of the volume of the dough to a significant amount of cooking. The products resulting from these combined treatments not only have the taste characteristics of fried or baked dough products, but, in addition, they exhibit a toasted flavor even though the entire volume of the product pieces is not subjected to a toasting operation. Moreover, the toasted dough can be directly fried to provide a fried product without undergoing intermediate rehydration. These results are accomplished while avoiding the necessity for heating the entire or principal bulk volume of the dough for the purpose of toasting, thereby providing savings in the energy requirements compared with those needed when the dough is partially toasted and subsequently fried or baked by conventional techniques. The process of the invention also minimizes the loss of nutrients from the product which may result from the sequential toasting and frying or baking the entire dough.

In preparing products of the present invention, a farinaceous dough can be suitably made in a variety of ways. Preferably, the dough has as its essential component at least a portion of a grain, such as corn, wheat, rice or other farinaceous grain solids, or potato solids, in comminuted form, along with water in amounts, when taken with any other material present, to provide a mixture of dough consistency. For instance, the finely-divided grain solids may be made from whole grains or the grains may be treated to remove portions such as the hull prior to comminution. The grain or potato solids may be raw or partially cooked or otherwise treated before or after comminution, but the mix made therefrom still has the characteristics of dough as distinguished from a toasted product, and the material which is subjected to frying or baking is accordingly referred to herein as dough. The dough frequently contain at least about 10 or 15 weight percent water, and preferably about 15 to 60 weight percent water, even after being subjected to the localized toasting operation of this invention which generally does not reduce the total moisture content of the dough by more than about 10 weight percent. The essential aqueous component of the dough may be supplied by water added as such or in other forms such as moisture in the grain or potato solids. The dough may also contain other ingredients, e.g., preservatives, starches, flavor-imparting additives and the like.

The dough passing to the toasting operation of this invention may be sheeted, rolled, extruded or otherwise formed into a layer which is relatively thin compared to its other dimensions. The dough, either before or after the selective toasting or subsequent frying or baking, can be formed into pieces such as chips, puffs or the like in any desired manner. The pieces formed from the dough often have a thickness of up to about 3 millimeters or somewhat more. The dimensions of the larger surfaces of the pieces are often at least about 1 centimeter or at least about 3 centimeters, and may be up to about 10 centimeters or more. The preferred products are chip-type products which conform to the shape of a mold, and thus the chips may be of uniform size and shape and capable of being stacked. The uncut dough or the cut dough pieces can be preconditioned, either before or after the selective toasting, to remove a portion of the moisture under relatively low temperature conditions, for example, below about 100° C., preferably about 50° to 100° C. The preconditioned dough may have a moisture content of, for example, about 20 to 40 weight percent.

In the method of this invention, the farinaceous dough is subjected to a selective or localized toasting operation. The heat required to effect the toasting is directed to a restricted, minor portion of the surface of the dough such that this portion of the surface is characterized by a golden brown to black color after toasting while the remaining surface is not significantly affected, e.g. not cooked to any significant extent. Especially for product appearance purposes, it is preferred that the toasted portions have a brown, rather than black, appearance. The toasting should not adversely affect the dough around the selectively toasted area, for instance, by unduly dehydrating the surrounding dough, but in any event, the toasting is conducted for a sufficient time and at a sufficient temperature to provide the desired toasted surface area. It is generally preferred to conduct the toasting operation in a short period of time, for instance, less than about 15 seconds, more preferably less than about 5 seconds, with a relatively hot heat source, e.g. having a temperature in excess of about 300° C., preferably about 350 to 500° C., to minimize the effect of the toasting on the surrounding dough. A sufficient portion of the surface of the dough piece is selectively toasted to impart the desired organoleptic properties to the dough when it is subsequently fried or baked. In general, a minor portion, for instance, about 3 to 20, preferably about 4 to 10, percent of the surface area of the dough is toasted.

The selective toasting of the method of this invention may be conducted by contacting the dough with a heated, metal object, e.g. a pattern or impression, which contacts only the intended localized area of the dough. Thus, the exposure of the portions of the dough which are to remain untoasted is minimized. The pattern or impression may be conventionally heated, for instance, by a gas flame or by electricity to obtain the desired toasting temperatures. The pattern or imprint may be adapted to contact the dough in any convenient manner, and preferably the dough surface contacted is essentially flat. The pattern may be, for instance, on the periphery of a drum which would roll on the dough as it passes beneath the roll on a conveyor or another drum. Another means for effecting selective toasting of the dough is by passing a sheet, or ribbon, of dough over a conveyor having upright, rod extensions, the tips of which are electrically heated and contact the dough to effect the toasting. In this manner, the exposure of the total dough to extreme heat would be minimized by localizing the heat on selected points on the dough.

In an aspect of the present invention, the toasted portion of the dough may be distributed over its surface such that the product provides a uniformly pleasing appearance as well as good organoleptic characteristics. The toasted portion may, for instance, provide a design configuration such as a design of letters or the like. The product may thus be provided with a design which assists in consumer recognition of the manufacturer's product. It is not necessary for providing good organoleptic characteristics for the dough to be toasted on more than one side, although this may be done, nor is it necessary that the toasted area extend significantly into the inner body of the dough.

In the method of this invention, the selectively toasted dough is fried or baked to be essentially completely cooked. Generally, the dough which is cooked is not toasted over the major portion of its surface area. Since the selective toasting does not unduly dehydrate the dough, it may be directly fried or baked without reconditioning and a suitable, formed product may be prepared with just a minor amount of expansion to provide the desired texture and appearance such as in conventionally prepared tortilla-type chip products. The moisture content of the fried or baked dough is generally below about 3% and is often about 1 to 2%, and preferably the products are esentially non-leavened. During frying, which is the preferred treatment, the temperature of the heating oil in which the dough is immersed is often at a temperature of about 175° to 220° C., preferably about 190° to 210° C., and the frying time of the dough may be about 10 to 45 seconds, preferably about 15 to 35 seconds. When the dough is removed from the frying bath, it contains oil used during frying and has at least a portion of this oil on its surfaces. Suitable frying oils include, for example, cottonseed oil, peanut oil, corn oil, palm oil or their mixtures.

The present invention will be further illustrated by the following example of a manner of obtaining the product. Corn masa was extruded onto a conveyor as a ribbon about 15 centimeters wide and 0.76 to 0.89 millimeters thick. The ribbon was partially dried in a heated oven to approximately 20% moisture. The ribbon was cut into pieces 5 centimeters wide and 6 centimeters long. The cut pieces were passed between two steel plates lying horizontally, one above the other, and separated by approximately 0.64 centimeter. The upper steel plate had a hole slightly larger than about 1.6 centimeters in diameter. Each corn piece was passed beneath the hole, and its upper, flat surface was contacted with a red-hot metal rod having a temperature of about 400° C. and a diameter of about 1.6 centimeters which was inserted through the hole in the overlying steel plate. The hot end of the rod contacted with the corn pieces had a slightly raised porting forming a design of letters, and was held in contact with each corn piece for about 3 seconds to toast an area corresponding to the design and which covered approximately 20% of the surface area of one side of the corn pieces. The pieces were then fried in oil for about 30 seconds at 204° C. The fried corn pieces were salted and exhibited a definite and pleasing toasted flavor along with good appearance and texture.

It is claimed:

1. A method for making edible dough products from a farinaceous dough containing from about 10 to about 60 weight percent water formed into a sheet which comprises selectively applying heat to a minor portion of the surface of said dough without significantly heating or cooking the remaining, major portion of the surface of said dough, said heating being sufficient to toast said minor portion of the surface without the heat used for toasting reducing the total moisture content of the dough by more than about 10 weight percent, and said minor portion being sufficient to impart a toasted flavor to the dough when subsequently fried or baked, and subsequently frying or baking said dough having said major portion of the surface which is not significantly heated or cooked, to provide a cooked dough product having said minor portion of the surface toasted such that in the final cooked product, the toasted area gives the entire cooked product a toasted flavor, when the product is consumed.

2. The method of claim 1 wherein the minor portion is about 3 to 20 percent of the surface area of the dough.

3. The method of claim 1 wherein the selectively toasted dough is fried.

4. The method of claim 3 wherein the dough is comprised of corn or potato solids.

5. The method of claim 4 wherein the dough product is in the form of a chip.

6. A method for making edible dough products which comprises forming a farinaceous dough containing from about 10 to about 60 weight percent water into a sheet and cooking the dough, said cooking consisting essentially of selectively subjecting a minor portion of the surface of the dough to sufficient heat to toast said minor portion of said surface, without said heat used for toasting reducing the total moisture content of the dough by more than about 10 weight percent, and without significantly heating or cooking the remaining surface of the dough, said minor portion being sufficient to impart a toasted flavor to the dough when subsequently fried, and subsequently frying the dough to provide a product having a toasted flavor such that in the final cooked product, the toasted area gives the entire cooked product a toasted flavor, when the product is consumed.

7. The method of claim 6 wherein the minor portion is about 3 to 20 percent of the surface area of the dough.

8. The method of claim 6 wherein the dough is comprised of corn or potato solids.

9. The method of claim 8 wherein the dough product is in the form of a chip.

* * * * *